Aug. 2, 1949.  A. S. FITZ GERALD  2,477,729
ELECTROMAGNETIC MOTOR CONTROL SYSTEM
Filed July 11, 1947  4 Sheets-Sheet 1

INVENTOR.
ALAN S. FITZ GERALD
BY Ward, Crosby & Neal
ATTORNEYS

Aug. 2, 1949.                A. S. FITZ GERALD                 2,477,729
                     ELECTROMAGNETIC MOTOR CONTROL SYSTEM
Filed July 11, 1947                                      4 Sheets-Sheet 2

INVENTOR.
ALAN S. FITZGERALD
BY
Hurd, Crosby & Neal
ATTORNEYS

Aug. 2, 1949.                A. S. FITZ GERALD                2,477,729
                    ELECTROMAGNETIC MOTOR CONTROL SYSTEM
Filed July 11, 1947                                    4 Sheets-Sheet 4

INVENTOR.
ALAN S. FITZ GERALD
BY
   Hard, Crosby & Heal
              ATTORNEYS

Patented Aug. 2, 1949

2,477,729

UNITED STATES PATENT OFFICE 2,477,729

ELECTROMAGNETIC MOTOR CONTROL SYSTEM

Alan S. Fitz Gerald, Wynnewood, Pa., assignor to Warren Webster & Company, Camden, N. J., a corporation of New Jersey Application July 11, 1947, Serial No. 760,398

21 Claims. (Cl. 318—30)

This invention relates to magnetic amplifying systems of the type which employ saturating reactors, and more particularly to systems of the above type which respond selectively in accordance with input signals of differing characteristics.

The more important electrical control systems, in connection with which there is a requirement for sensitive amplifying or responsive devices capable of operation with inputs of very low power level, are of the type represented by automatic self-balancing bridges, servo-mechanism circuits, and automatic regulating or similar systems having a normal condition of balance or stability from which deviations are possible in more than one sense; as for example, high or low, fast or slow, leading or lagging.

In such arrangements, the sensitive device must be responsive selectively in accordance with the sense of the unbalance or deviation, and the output delivered must be of the form permitting action in either of two corrective directions as well as a continued state of inaction as long as the normal or balanced condition of the automatic regulation is maintained. For example, the output must be capable of operating a motor selectively in either the forward or the reverse direction or of causing the motor to remain at rest.

In my co-pending U. S. application, Serial No. 588,194, filed April 13, 1945, now Patent Number 2,464,639, patented March 15, 1949, I have disclosed a magnetic amplifier system responsive to a direct current input and capable of furnishing an output selectively variable in accordance with the polarity of the input signal.

It is an object of my present invention to provide an improved magnetic amplifier system which can receive an alternating current input signal and which is responsive selectively in accordance with the phase relation between the voltage of the input signal and a reference A. C. voltage.

It is another object of my invention to provide a magnetic amplifier capable of responding selectively to A. C. inputs, such as, for example, unbalance A. C. voltages derived from A. C. energized bridges; A. C. sensing voltages from servo-mechanism circuits; A. C. differential voltages from automatic regulating systems or the like.

It is a further object of my invention to provide a magnetic amplifier completely free from the difficulties associated with abnormal input power levels very greatly exceeding normal signal response levels, which are encountered with magnetic amplifiers responsive to direct current inputs. It is well known to those skilled in the art that special measures have to be taken to protect some types of D. C. input amplifier from high signal levels because they tend to paralyze under such conditions and are also liable to a zero-shift due to hysteresis or residual magnetic effects. Various forms of direct current limiter arrangements have been devised for such purposes. Since such devices depend for their action upon non-linear direct current conductivity, difficulties sometimes arise due to the fact that it is not always possible readily to secure non-linear conducting devices having exactly the voltage-current characteristics desired.

These difficulties are entirely eliminated in my present invention since direct current limiting devices are not necessary. Because the input signal is alternating, it is possible to employ simple alternating current saturable core input limiting arrangements which can readily be furnished for any desired signal voltage merely by the use of an appropriate number of turns for the winding, and cross-section of the core.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which:

Figs. 5 and 6 illustrate details of the modification of my invention shown in Fig. 4;

Figure 1:
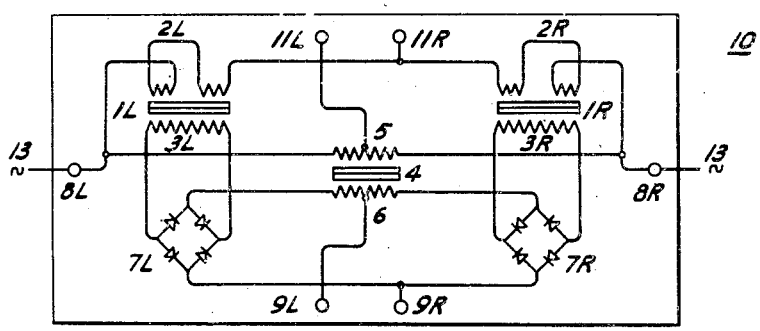
Fig. 1 is an electrical circuit diagram showing a single stage magnetic amplifier in accordance with an embodiment of my invention.

Referring to the drawings, I show in Fig. 1 a magnetic amplifier circuit comprising a pair of saturating reactors, each of like design, having a magnetic core 1, an alternating current or reactance winding 2, and a direct current saturating winding 3. The structural configuration of the core 1 and the disposition thereon of the windings may be in accordance with any of the several known types of saturating reactors of the prior art, such as I have illustrated, for example, in Figs. 2 and 3 of my co-pending application, Serial No. 666,867, filed May 3, 1946, now Patent Number 2,461,046, patented February 8, 1949.

In view of the fact that all these elements occur in duplicate I have identified all those comprising the left hand portion of the circuit by a suffix "L" and those in the right hand portion of the circuit by a suffix "R."

I show also, a transformer having a core 4, a primary winding 5, and a secondary winding 6. Both the primary winding 5 and the secondary winding 6 are provided with mid-point taps.

I show also in Fig. 1 a pair of rectifiers 7L, 7R.

As shown in the diagram the reactance windings 2L, 2R, are connected in series to two binding posts 8L, 8R across which latter the primary winding 5 is also connected. As shown in the drawing, the binding posts 8L, 8R are energized from an alternating current supply 13. I show also in Fig. 1 a pair of input terminals 9L, 9R, for receiving an A. C. input signal. As may be seen in the diagram the saturating windings 3L, 3R are respectively energized with rectified current from the rectifiers 7L, 7R. The upper A. C. connections of the rectifiers 7L, 7R are, as shown in the diagram, connected to the two extremities of the secondary winding 6. The lower A. C. connections from the rectifiers 7L, 7R are both connected to binding post 9R. Binding post 9L connects with the mid-point tap of winding 6.

I show also in Fig. 1 a pair of output binding posts 11L, 11R. Of these the former is connected to the mid-point tap of the primary winding 5, and the latter is connected to the junction points of 2L, 2R.

According to these connections it will be apparent to those skilled in the art, that, with 8L, 8R energized with A. C., in the absence of any direct current in the saturating windings 3L, 3R, the junction of 2L, 2R, and the mid-point tap on the winding 5 respectively, will be equi-potential points. Accordingly there will be no A. C. voltage appearing between 11L and 11R.

Referring now to the windings 3L, 3R it will likewise be apparent that, there being provided a connecting path between the input binding posts 9L, 9R, in the absence of any input or signal voltage present in this path, rectifiers 7L, 7R will be energized, equally, with A. C. from the right and left hand sections of the transformer secondary 6. Accordingly, rectified currents, likewise of equal magnitude, will flow in the saturating windings 3L, 3R. Under these circumstances the cores 1L, 1R will be saturated to like extents and the A. C. voltage drops across the reactance windings 2L, 2R will likewise be equivalent. The output binding posts 11L, 11R will therefore, as before, be equipotential points.

If there be now applied to the input binding posts 9L, 9R, an A. C. signal voltage of the same frequency as, and in sychronous relation with, that applied to 8L, 8R, which latter will hereinafter be referred to as the reference voltage, the effect upon the circuit arrangement shown in Fig. 1 will depend upon the phase relation between the signal voltage and the reference voltage. For example, if the signal voltage be in phase with the reference voltage such that 9R is momentarily positive with respect to 9L at the same instant that 8R is positive with reference to 8L, the signal voltage will be added to that of the A. C. voltage energizing one of the rectifiers and will be subtracted from that of the other. For example, let it be assumed that the connections of 5 and 6 are so made that under these conditions the energization of 7R is increased and that of 7L is decreased. This will result in an increase in the saturation of core 1R and a decrease in the saturation of the core 1L, and in like manner a reduction in the A. C. voltage across 2R and an increase in the A. C. voltage across 2L. Thus 11L and 11R will no longer be at the same potential and a difference voltage will appear between the output binding posts.

If now the phase of the input signal be reversed through 180 degrees it will be apparent to those skilled in the art that there will again appear an A. C. voltage between 11L and 11R of the same magnitude as previously, but that the phase of this output voltage will likewise be reversed through 180 degrees, since, now, the energization of 7L will be increased and 7R decreased, as a result of which the voltage across 2L will now be less than that across 2R.

It will also be apparent that if the signal voltage, applied to 9L, 9R, be in quadrature with the reference voltage, the energization of 7L and 7R will both, in accordance with the vector sum and vector difference, be arithmetically increased to the same extent and under this operating condition there will be no voltage appearing between 11L and 11R.

It may be said, therefore, that the action of this circuit is such as to deliver an output voltage which depends jointly upon the magnitude of the signal voltage and the sine of the angle between the signal voltage and the reference voltage; that is to say, the "in phase" component, positive or negative as the case may be.

I have designated the group structure of Fig. 1 collectively by the reference numeral 10.

Figure 2:
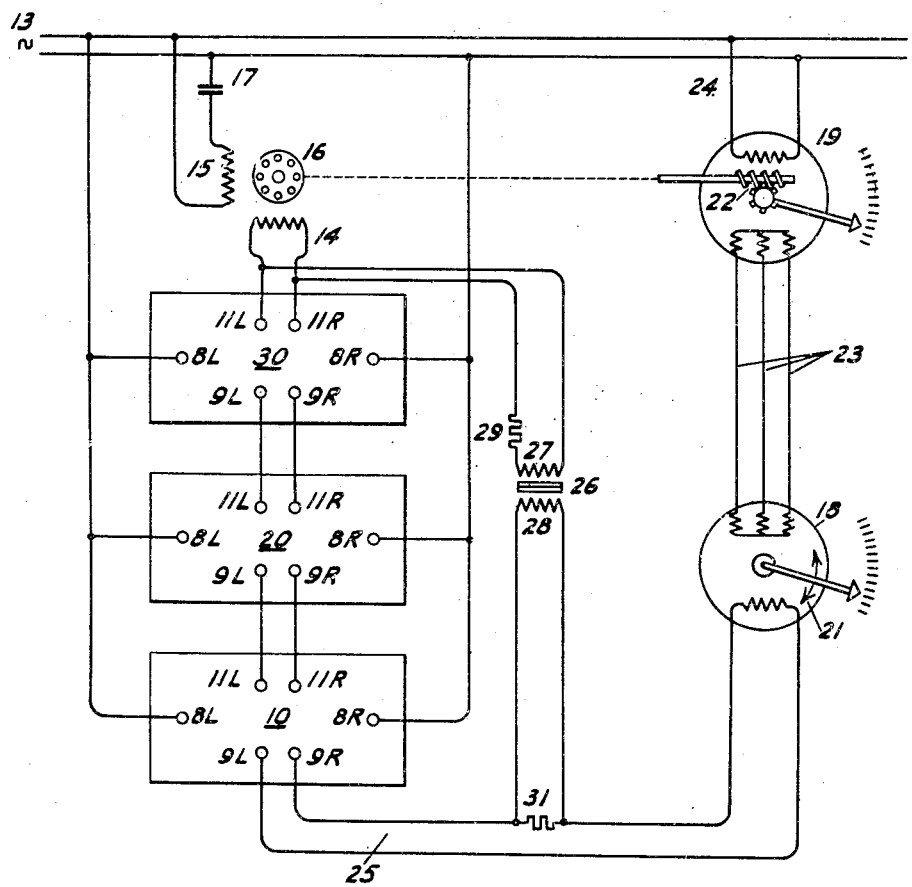
Fig. 2 is an electrical circuit diagram showing a multi-stage magnetic amplifier in accordance with the embodiment of my invention shown in Fig. 1, adapted to control a servo-mechanism.

I shown in Fig. 2 the manner of use of the magnetic amplifier system of Fig. 1.

Fig. 2 illustrates an arrangement appropriate for the control of a two phase induction motor of the type in which one phase is energized continuously from the reference voltage and the other phase is controlled by the magnetic amplifier, in connection with a remote positioning control arrangement of conventional type, such as is well known to those skilled in the art by the nomenclature Selsyn, Autosyn or the like, it being understood that the Selsyn device is used as the sensing element and not for the purpose of furnishing positioning rotational effort.

In Fig. 2 I show a first stage magnetic amplifier 10, substantially as described in reference to Fig. 1. I show also, a second stage 20, and a third stage 30. The circuit arrangements of the second and third stages may be identical with that of the first stage, as illustrated in Fig. 1, but may have different circuit constants as may be appropriate for the higher power levels existing in the second and third stages respectively.

All three stages are energized, in parallel as shown from a source of alternating current power 13, through the binding posts 8L, 8R, of each stage.

As shown in Fig. 2, the output binding posts 11L, 11R of the first stage are connected to the input binding posts 9L, 9R of the second stage. In similar manner the output of the second stage is connected to the input of the third stage.

The output binding posts 11L, 11R of the third stage are connected to one of the windings 14 of the two phase induction motor having a second winding 15 and a rotor 16. The second winding 15 is connected in series with a condenser, 17, to the A. C. source 13.

Thus the winding 15 is continuously excited with A. C. energy of substantially constant magnitude of which the phase relation is approximately in quadrature with the reference voltage derived from the supply 13. The motor winding 14, on the other hand is only energized when output is delivered from the third stage 30 of the magnetic amplifier; and, as is well understood by those skilled in the art the direction of rotation of the motor will depend upon the phase relation between the magnetic amplifier output and the reference voltage derived from the supply 13.

Thus if there is no signal voltage applied to the input binding post 9L, 9R of the first stage 10 of the magnetic amplifier, there will be no output delivered from the binding posts 11L, 11R of 10 to the input binding posts 9L, 9R of the second stage 20; in consequence the second stage will deliver no output to the third stage 30 which in turn will not energize the motor winding 14. Accordingly the motor will not operate.

The same condition will result if the signal voltage applied to the input of the first stage 10 be in quadrature with the supply 13.

However, if the signal voltage contains a positive or negative "in phase" component, with reference to the voltage of the supply 13, output will be delivered by the first stage to the second, which, in turn, will energize the third stage. Thus, the latter will supply the motor winding 14 with current, the phase relation of which will be either substantially in phase with the voltage of 13, or 180 degrees displaced therefrom according to whether the "in phase" component is positive or negative. Since the winding 15 is supplied through the condenser 17, torque will be developed by the motor the direction of which will be in accordance with the input signal.

In Fig. 2 I show a pair of Selsyn devices 18 and 19. The movable element of one of these, as for example that of 18 is rotatable by an external agency suggested at 21. The movable element of the other Selsyn 19, is actuated by the rotor 16, of the motor, through any suitable mechanical gearing or connection indicated in Fig. 2 at 22.

The Selsyns are connected in the conventional manner, that is to say, the three-conductor circuits are connected together as shown at 23. One of the two-conductor circuits is connected to the A. C. supply 13 as shown at 24, and the other two-conductor circuit is connected to the input binding posts 9L, 9R of the first stage 10 of the magnetic amplifier, as shown at 25.

According to this arrangement when the two Selsyns are in exact coincidence of alignment there will be no voltage appearing at 25 and the motor will remain at rest. If the rotor of the Selsyn unit 18 be displaced from this position by the agency 21 an A. C. voltage will appear at 25 which will either be substantially in phase with 13, or will be 180 degrees displaced therefrom.

This voltage will energize the magnetic amplifier which will cause the motor to operate either in the forward or reverse direction according to the phase relation of the input signal, which latter, in turn, will be dependent upon the direction in which the rotor of 18 has been displaced. Thus the rotor of the Selsyn unit 19 will be turned in the same direction as that of 18. When it is again in coincidence of position the amplifier will be deenergized and the motor will either come to rest, or, according to the gear ratio of 22, will oscillate back and forth in the manner familiar to those skilled in the art of servo-mechanisms.

I have shown in Fig. 2 one form of an anti-hunt device which I have found to be particularly effective for eliminating oscillation, or for very substantially reducing the amplitude.

This comprises a small transformer having a magnetic core 26, a primary winding 27 energized, in parallel with the motor winding 14, from the output terminals 11L, 11R of the last stage 30.

The transformer has a secondary winding 28 which is connected in series with one of the conductors 25 connecting the output of the Selsyn 18 to the input terminals 9L, 9R of the first stage 10.

I have also shown in Fig. 2 a resistor 29 connected in series with the primary winding 27 and a resistor 31 connected in parallel with the secondary winding 28.

I have found that the use of these two resistors forms a convenient method of adjusting the anti-hunt circuit in the event that the windings 27 or 28 are not exactly of the numbers of turns which give the best results. However, if these windings are made of precisely the correct turns the resistors may be dispensed with.

I have found that this circuit operates effectively if the core 26 of the anti-hunt transformer be of ordinary transformer core material. However, I have found that the performance is improved if a high permeability core material be used.

I particularly wish to point out a novel feature in this anti-hunt system, in that, when the correct polarity of connection of the primary and secondary windings 27, 28, is made, there is established a feed-back effect whereby the magnetic amplifier system itself can be adjusted so that it oscillates or pulsates in the absence of any motion at all of the mechanical system, that is to say the rotor 16 or the movable elements of the Selsyns 18 or 19.

I have described pulsating or oscillating magnetic amplifier systems in my U. S. Patent #2,168,402.

Whether or not adjustment be made so that oscillation of the magnetic amplifier actually occurs, the anti-hunt action is effective. For example, if the circuit constants of the anti-hunt transformer circuit be so chosen that the magnetic amplifier is near the point of oscillation the normal tendency of the servo-mechanism circuit to oscillate will be damped out. In one practical example of this invention, I found that in the absence of the anti-hunt system the mechanical system hunted continuously over a total range of about ten degrees of rotation. When the anti-hunt circuit was applied the hunting ceased.

On the other hand, when the circuit constants of the anti-hunt system were adjusted so that the magnetic amplifier per se oscillated continuously the effect upon the servo-mechanism was to cause the latter to hunt continuously within a much narrower range than occurred without the anti-hunt system. For example, under this condition the Selsyn would hunt continuously within a total range of one degree.

This latter condition may be particularly suitable for some types of high sensitivity servo-mechanism applications in that the mechanical system never comes completely to rest; and accordingly the element of static friction is not a factor affecting the sensitivity of the system.

I have found that the best results are obtained when the conditions are such that oscillation of the magnetic amplifier just occurs.

The most convenient manner of arriving at the optimum operating condition is to provide a suitable variable gain control adjustment at some suitable point in the magnetic amplifier system. I have found that this may readily be done by varying, in any suitable or convenient manner, the voltage of the transformer secondary winding 6.

It is sufficient if this be applied to one stage only. For example, such a control may conveniently be incorporated in the second stage 20.

I prefer not to apply an adjustable feature to the transformer winding 6 of the first stage 10 as it is desirable that, in the first stage, the voltage of the winding 6 be somewhat higher than that which gives maximum gain. For example, if the voltage of the transformer winding 6 in the first stage be set at that which gives best gain, it may, in some instances, be found that entirely satisfactory operation of the magnetic amplifier may not be obtained if the Selsyn 18 be suddenly given a substantial displacement such that the voltage applied to the input of the first stage may approach the maximum possible value. This value will of course very greatly exceed the normal operating value to which it is necessary that the magnetic amplifier respond.

On the other hand I have found that, if the voltage of the secondary winding 6, in the first stage, be two or three times the value which gives maximum gain, while there will not be any great sacrifice in gain, the magnetic amplifier will respond reliably to any input which may result from any possible operating condition of the Selsyn system. For this reason I prefer not to apply a gain control to the first stage.

Such a control may readily be applied to the second, or third stage, as for example, by furnishing the secondary winding 6 with taps. Alternatively, the secondary winding 6 may be situated upon a separate transformer, the primary of which may be variably energized, without introducing any phase shift, from the A. C. supply 13 by means of a variable-ratio transformer or an adjustable potentiometer.

Figure 3:
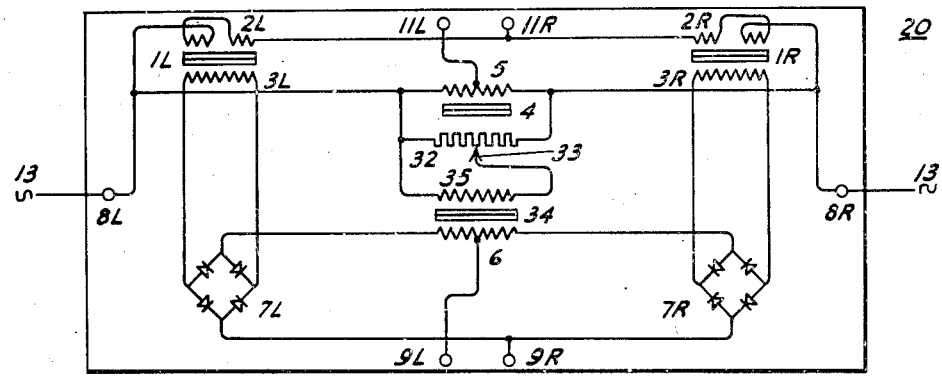
Fig. 3 is a modification of the Fig. 1 circuit illustrating an arrangement for providing gain control adjustment.

I show in Fig. 3 a single stage incorporating a gain control adjustment arranged in this manner. The connections of Fig. 3 are similar to the arrangement shown in Fig. 1 and the binding posts, saturating reactors, and rectifiers are identified by the same reference numerals.

However, in Fig. 3 the secondary winding 6 of the transformer is omitted from the core 4 and is situated on a separate core 34. The core 34 also carries a duplicate primary winding 35. I connect, in parallel with the primary winding 5, a potentiometer resistance 32 having an adjustable connection 33 by means of which the energization of 35 may be varied. Provided that the resistance value of 32 is so selected that the current drawn thereby substantially exceeds the current drawn by the primary winding 35 no substantial phase shift difficulty will arise from the use of this arrangement.

Figure 4:
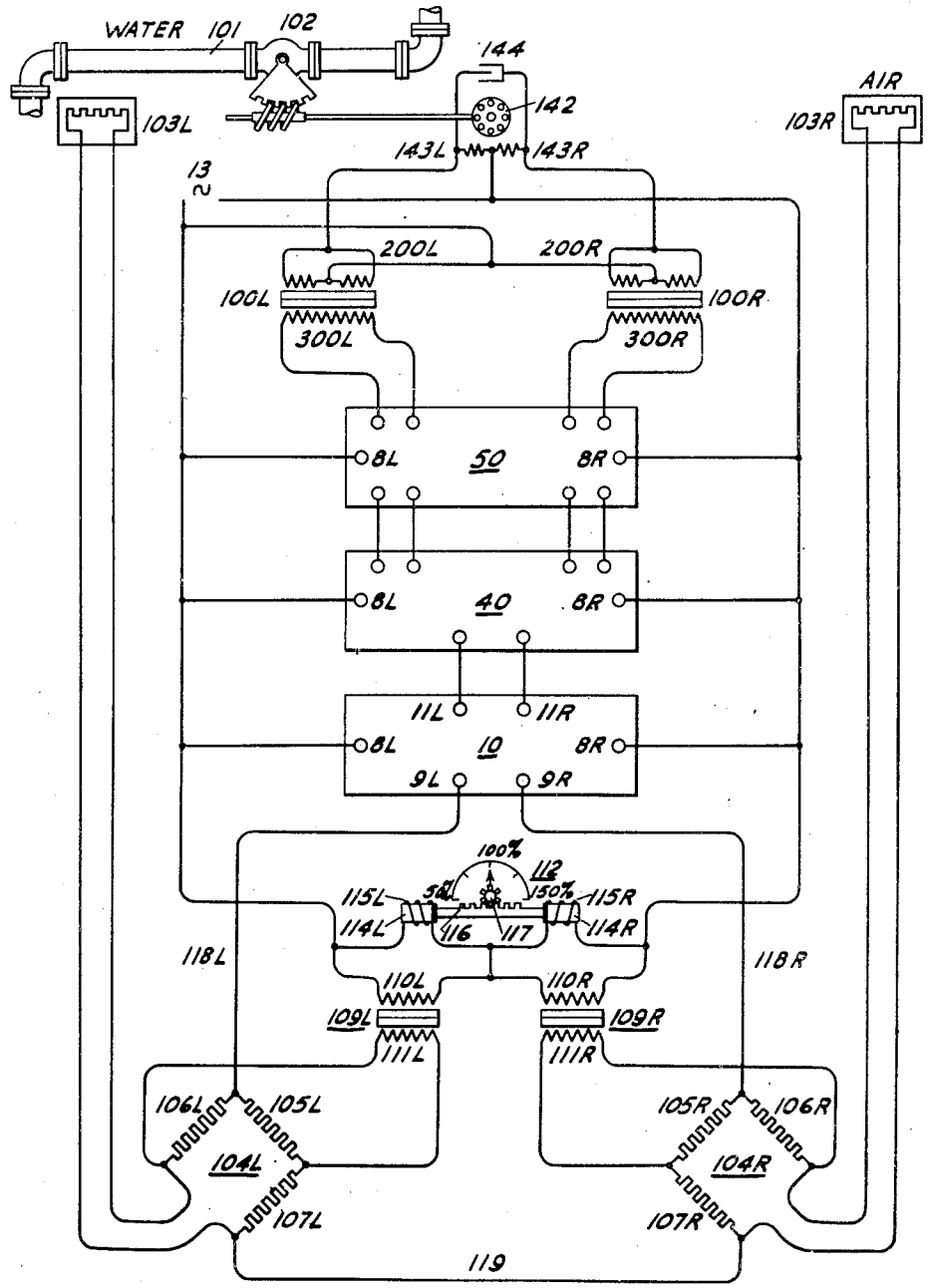
Fig. 4 is a diagram illustrating a modification of my invention.

I show in Fig. 4 a modification of my invention comprising a circuit arrangement particularly suitable for the operation of a type of alternating current motor having different connections from that shown in Fig. 2.

One form of reversing motor commonly employed in industrial applications is designed to be operated in such a manner that, under conditions when it is not desired that the motor be actuated, neither of the two windings are substantially energized.

I show in Fig. 4 an application of the alternating current input type of magnetic amplifier in accordance with my present invention, to a heat control system of the general type which I have disclosed in my co-pending application, Serial No. 715,855, filed December 12, 1946, to which reference may be had for further detailed description.

In brief, the heat control system of my copending application comprises a pair of bridge circuits, one of which includes a thermal resistance element responsive to the temperature of the heating fluid; the other includes a thermal element responsive to the temperature of the outside air.

The out-of-balance E. M. F.'s derived from these two bridges as a result of change in either the fluid temperature or the air temperature are balanced or compared; and the resultant difference voltage is applied to a magnetic amplifier. The output of the magnetic amplifier controls a motor for increasing or decreasing the amount of heat delivered as may be required.

In my above cited co-pending application the two bridges are energized with direct or rectified currents. Thus the magnetic amplifier is of a type responsive to direct current input of reversible polarity.

In my present invention the bridges are energized with alternating current and accordingly the magnetic amplifier, as disclosed in the present application, is responsive to alternating current input.

In my present application, Fig. 4 shows an arrangement substantially similar to the structure shown in Fig. 1 of my co-pending application, Serial No. 715,855, except that the rectifiers for energizing the bridges are omitted. There is also omitted certain detailed structure comprising switching arrangements for varying the settings and characteristics of the controlling system in order to simplify the diagram and description.

In Fig. 4 I show a portion of a fluid or vapor heating system 101, including a control valve 102. The valve 102 is actuated through a temperature responsive control system comprising a pair of thermal resistance elements 103L, 103R. The element 103L is mounted adjacent to or otherwise responsive to, the temperature of the heating medium. The thermal element 103R is mounted at a suitable location out-of-doors so as to be responsive to the ambient external temperature.

According to my invention the heating medium is at all times maintained at a temperature which is in direct relation with the ambient temperature.

My control system comprises two bridge circuits 104L, 104R each comprising the thermal elements 103L, 103R and three other resistors of fixed value 105L, 105R, 106L, 106R and 107L, 107R.

The bridges 104L, 104R are energized from an A. C. source 13 through two isolating transformers 109L, 109R having primary windings 110L, 110R and secondary windings 111L, 111R.

The two primary windings 110L, 110R as shown in the drawing, are connected in series across the source 13. I also connect across the source 13 a control device 112 for manually varying the relative energization of the transformers 109L, 109R; and accordingly the relative energization of the bridges 104L, 104R likewise. The control device 112 comprises a variable inductance structure consisting of two solenoids having conjoined plungers 114L, 114R partially entering into coils 115L, 115R together with manually operable means such as a rack 116 and a pinion 117.

The junctions between 110L, 110R and 115L, 115R respectively are connected together.

It will be apparent to those skilled in the art that when the two plungers 114L, 114R are in mid-position, that is to say, equally entrant into the windings 115L, 115R, the voltages across 115L, 115R will be equal as will also be the voltages across the primary windings 110L, 110R.

It will be evident that if the plungers 114L, 114R are moved towards the right so that 114R enters further into the coil 115R and the plunger 114L is retracted from the coil 115L, the impedance of 115R will increase and that of 115L will decrease. Accordingly the voltage across 110R will increase and that across 110L will decrease. Thus the energization of the bridge 104R will be augmented and that of the bridge 104L will be reduced.

As shown in Fig. 4 the bridges 104L, 104R are energized across their horizontal diagonals with alternating current from the transformer secondary windings 111L, 111R. The bridges 104L, 104R are connected in series through their vertical diagonals by means of conductors 118L, 118R, and 119.

If the resistors 105L, 105R, 106L, 106R be considered to be bridge ratio arms of equal value, the value of the resistance in the arms adjacent to the thermal elements 103L, 103R, that is to say the arms in which resistors 107L, 107R are situated, may be adjusted so that the bridges are in balance under temperature conditions such that no heating control action is desired. This might be the case if the ambient temperature out-of-doors were about 70° F., as might also be the temperature of the fluid in the heating system 101.

Thus the bridges 104L, 104R may be considered to be in balance at 70° F. at which condition there will be no E. M. F. existing between conductors 118R and 119; nor between 118L and 119. Should the weather become colder the bridge 104R will no longer remain in balance and there will appear between conductors 118R and 119 an alternating current voltage the magnitude of which will be in accordance with the drop in outdoor temperature. For the purpose of explanation of the operation of my invention it will be assumed that the connections for energizing the bridge 104R from the transformer secondary 111R are made so that when the bridge goes out-of-balance due to fall of temperature, the voltage between 118R and 119 is in phase with the voltage of the source 13.

The bridge 104L being adjusted as described to balance at 70° F., the thermal unit 103L will, normally, be subjected to temperatures rising above 70°. Accordingly the connections between the bridge 104L and the transformer secondary 111L are made so that when the bridge goes out-of-balance with increase of heating fluid temperature, the voltage between 118L and 119 is in phase with the reference voltage.

As may be seen in Fig. 4 the bridges 104L, 104R, as to their vertical diagonals are connected by means of the conductors 118L, 118R and 119, in opposition. Conductors 118L, 118R are connected to a magnetic amplifier for controlling the valve 102, and apply to the input of the magnetic amplifier an A. C. voltage representing the difference between the output voltages of 104L and 104R.

The magnetic amplifier comprises a first stage 10 which may be substantially the same as the arrangement disclosed in Fig. 1 of the present application. The magnetic amplifier has a second stage 40 and a third stage 50. The detailed internal connections of the second stage 40 and the third stage 50 are shown respectively in Figs. 5 and 6.

Referring to Fig. 5 the second stage 40 includes a pair of saturating reactors each having magnetic cores 1L, 1R, alternating current windings 2L, 2R and direct current windings 3L, 3R similar to the arrangement shown in Fig. 1. Likewise, the direct current windings 3L, 3R are energized with direct current from rectifiers 7L, 7R which latter are connected, in a manner similar to that of the arrangement of Fig. 1, to the transformer secondary winding 6 and to a pair of input binding posts 9L, 9R.

In Fig. 5 I show a transformer having a core 4, a primary winding 5 and a secondary winding 6. As in Fig. 1, the secondary winding 6 is furnished with a mid-point tap. In the present arrangement, however, no mid-point tap is required on the primary winding 5. The primary winding 5 is energized as in Fig. 1, from the A. C. supply 13, through binding posts 8L, 8R.

I show also two additional secondary windings 6L, and 6R. I show also in Fig. 5 a second pair of rectifiers 41L, 41R which latter are energized with alternating current in series with the saturating reactor A. C. windings 2L, 2R from the transformer secondary windings 6L, 6R.

The direct current output circuits of the rectifiers 41L, 41R are connected additively in series, including in this series circuit two resistors of like value 42L, 42R.

In Fig. 5 I show a junction point 43 between 41L, 41R and another junction point 44 between 42L, and 42R. To these junction points I connect conductors 45 and 46 respectively.

It will be apparent to those skilled in the art that with this method of connection, when the rectified currents delivered by 41L, 41R are exactly equal, 43 and 44 will be equipotential points, and no output will be delivered by conductors 45 and 46.

If, however, the output of 41R be greater than that of 41L, which condition, it will be noted, occurs when the core 1R is more greatly saturated than the core 1L, then 43 will become positive with reference to 44. Thus, conductor 45 will become positive with respect to conductor 46. If, on the other hand, core 1L be more greatly saturated than core 1R, then, in like manner 44 will become positive with respect to 43.

I show in Fig. 5 two pairs of output binding posts 47L and 47R. As shown in the diagram both of these pairs of binding posts are connected, in parallel, by conductors 45 and 46 to the equipotential points 43 and 44, through two half-wave rectifiers 48L and 48R.

The action of these two half-wave rectifiers is to cause the output of the second stage 40 to be delivered at binding posts 47L or 47R, selectively, according to the relative polarity of the direct current energization of conductors 45 and 46. That is to say, if the junction point 43 is positive with respect to the junction point 44 output will be delivered at binding posts 47R, and binding posts 47L will be deenergized.

In other words, if the core 1R is more greatly saturated than IL, binding posts 47R will be energized. If, on the other hand, the core IL be more greatly saturated than the core IR, binding posts 47L will be energized.

The relative saturation of cores IL and IR will be in accordance with the explanation already made in respect of Fig. 1. That is to say, the saturation of these cores will depend upon the phase relation of the input voltage applied to the first stage with respect to the reference voltage. Accordingly, therefore, the action of the second stage 40 is such as to convert an input received in the form of an alternating current phase relation into an output furnished in the form of selective energization of one or other of two separate output circuits.

Thus, in Fig. 4 whenever the output of bridge 104R exceeds that of 104L, the phase relation of the voltage applied to binding posts 9L, 9R of the first stage 10, and in like manner, the phase relation of the voltage applied to the binding posts 9L, 9R of the second stage 40 will be such as to cause 40 to deliver its output at binding posts 47R with zero energization of binding posts 47L. Conversely, under temperature conditions such that the output of 104L is greater than that of 104R the second stage 40 delivers output at binding posts 47L instead of at 47R.

I show also in Fig. 4 a third stage 40 adapted to receive the output, selectively directed in the manner above described, from the second stage 40.

As shown in Fig. 6 the third stage 50 consists of a duplicate pair of neutral type magnetic amplifiers of the type disclosed in my co-pending application, Serial No. 666,867, filed May 3, 1946, now Patent Number 2,461,046, patented February 8, 1949, to which reference may be had for a further detailed description.

In brief, the two neutral magnetic amplifiers include saturating reactors having cores IL, IR, A. C. windings 2L, 2R, and saturating windings 3L, 3R together with compensating transformers comprising cores 54L, 54R, primary windings 55L, 55R and the secondary windings 56L, 56R.

I show also resistances 57L, 57R, 58L, 58R and rectifiers 51L, 51R.

I show also two pairs of input binding posts 52L, and 52R to which the saturating windings 3L and 3R are connected and two pairs of output binding posts 53L, 53R which are connected to the D. C. outputs of the rectifiers 51L, 51R.

As shown in Fig. 6, both of these neutral type amplifiers are supplied with A. C. energy from the source 13 through the supply binding posts 8L, 8R.

As shown in Fig. 4, the input binding posts 52L, 52R are connected respectively to the output binding posts of 47L, 47R of the second stage 40.

The circuit constants of the arrangement shown in Fig. 6, particularly the values and characteristics of the saturating reactors, the transformers, and the resistors 57L, 57R, and 58L, 58R are apportioned in accordance with the description and explanation given in my co-pending application, Serial No. 666,867, now Patent Number 2,461,046, patented February 8, 1949.

Briefly, the action of the networks which these circuit elements comprise is such that when there is no input delivered to binding posts 52L, or 52R no energization of the output binding posts 53L or 53R results. When, however, input binding posts 52L or 52R receive input energy from the second stage 40, amplified output is delivered at either 53L or 53R in accordance with the selective action of the second stage 40 which in turn depends upon the phase relation of the A. C. input.

It is to be noted that, in drawing the diagram shown in Fig. 6, I have, in comparison with Fig. 1 of my co-pending application, Serial No. 666,867, now Patent Number 2,461,046, patented February 8, 1949, transposed the order of the two series-connected elements, to wit, the secondary windings 56L, 56R of the transformers and the A. C. connections to the rectifiers 51L, 51R. The drawing of the diagram is simplified by showing the connections in this manner, but no effect of any kind on the electrical action or operation of the circuits results therefrom.

Likewise, in order to avoid crossing of wires in the diagram I have in Fig. 6 of the present application reversed the position of the primary and secondary transformer windings as compared with the manner in which they were shown in my above cited application.

In Fig. 4 the valve 102 is actuated by a motor which may be of the induction type having a rotor 142, windings 143L, 143R and a capacitor 144 all as described in my co-pending application, Serial No. 715,855. The motor windings 143L, 143R are energized from the A. C. source 13 in series with the A. C. windings 200L, 200R of two further saturating reactors having cores 100L, 100R and D. C. saturating windings 300L, 300R which latter are connected to the output binding posts 53L, 53R of the third stage 50.

According to this arrangement it will be apparent to those skilled in the art that when the temperature conditions are such that outputs of the two bridges 104L, and 104R are exactly equal there will be no voltage applied to the input binding posts 9L, 9R of the first stage. Accordingly, there will be no input applied to the second stage 40 as a result of which neither of the second stage output circuits will deliver current to the third stage 50 either at binding posts 52L or binding posts 52R.

Similarly the last stage D. C. windings 300L, 300R will be de-energized as a result of which no substantial current will flow in either of the motor windings 143L or 143R.

When a change occurs in the relation between the temperature of the heating fluid and the air temperature, such that there is a difference between the outputs of the bridges 104L, 104R, an A. C. difference voltage will be applied to the input binding posts 9L, 9R of the first stage 10, the phase relation of which, with reference to the voltage of the source 13, will depend on which be the greater of the output voltages of the bridges 104L, 104R. When this occurs, one or other of the D. C. windings 300L, 300R, will be energized, according to the temperature condition and the phase relation of the A. C. input to the first stage 10, and the motor will operate in one direction or the other, so as to increase or decrease the amount of heat, as may be required by the conditions existing.

It will be seen that in accordance with the arrangement shown in Fig. 4 neither of the windings 143L or 143R of the motor are energized to any substantial extent except at times when it is desired that the motor be operated.

The selective amplifying arrangements shown in Figs. 5 and 6 are also particularly suitable for use in magnetic amplifiers in which power levels of substantial magnitude are involved.

Figure 7:
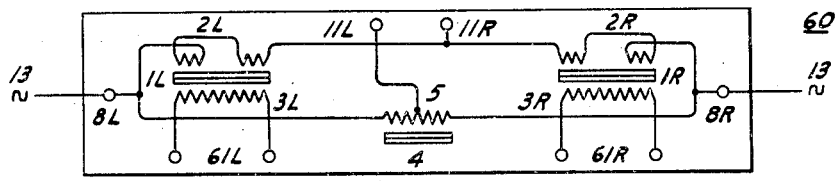
Fig. 7 is a further modification of my invention.
Figure 8:
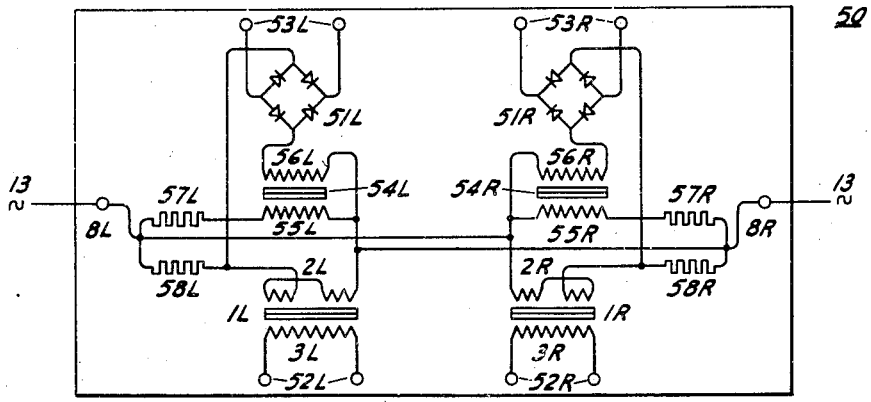
Figure 9:
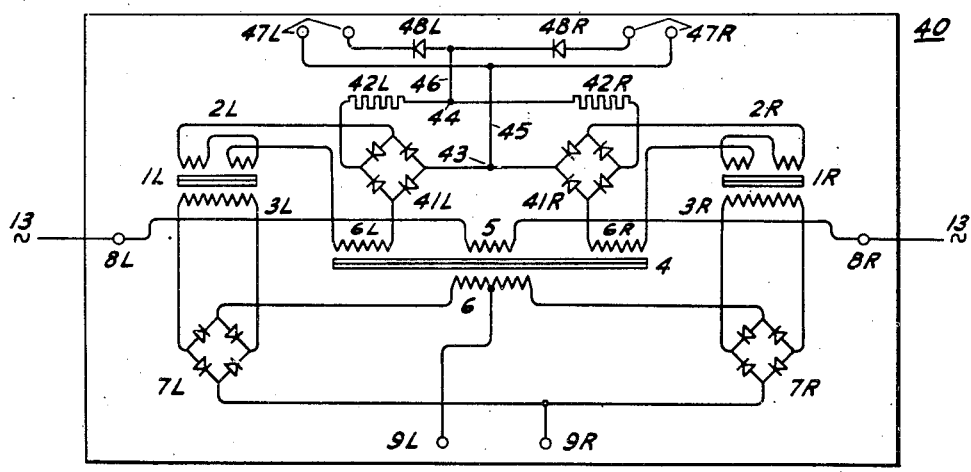

In the event that it might be desired to utilize for the arrangement shown in Fig. 4, a motor of the form shown in Fig. 1, at the same time employing amplifying arrangements according to the second and third stages 40 and 50, this may be done by connecting binding posts 53L, 53R, to an arrangement such as I have shown in Fig. 7, in place of the final saturating reactors which control the motor in Fig. 4.

Fig. 7 shows a magnetic amplifier stage 60, similar to the arrangement of 10 in Fig. 1, and identical therewith in respect of the connections for deriving output therefrom. However, in Fig. 7 the rectifiers 7L, 7R, the transformer secondary 6, and the binding posts 9L, 9R are omitted, the D. C. windings 3L, 3R being directly connected to two pairs of input binding posts 61L, and 61R.

Accordingly in the event that an arrangement according to Fig. 7 be utilized to follow a stage of the type shown at 50, the binding posts 53L and 53R are connected to the binding posts 61L and 61R in the place of the D. C. windings 300L and 300R.

I have referred in the preamble of this specification to the advantages of a magnetic amplifier system responsive to alternating current input with particular reference to the effects of input power levels which very greatly exceed the response level desired for normal operation. I have found that in servo-mechanisms such as I have shown in Fig. 2 it is possible to secure entirely satisfactory operation with any output power level that can be delivered by the Selsyns, provided that the first stage, in the manner hereinbefore explained and described, be appropriately designed.

However, I have found that in magnetic amplifier systems and applications it is frequently required that under extreme or abnormal unbalance conditions of bridges or other devices input power levels occur which exceed the minimum desired response level to extents much greater than commonly occur in servo-mechanisms such as arrangements shown in Fig. 2. I show in Figs. 8, 9 and 10 several other simple arrangements which enable such conditions readily to be met.

Figure 8:
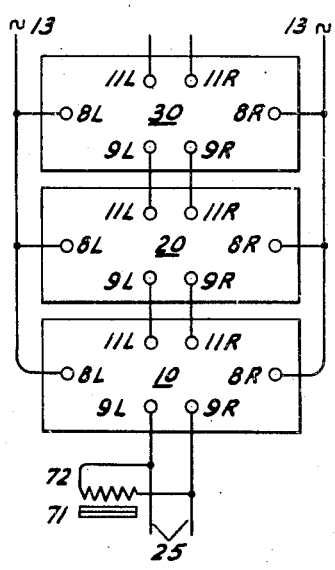
Figs. 8, 9 and 10 are diagrams illustrating additional modifications of my invention.

I show in Fig. 8 a three-stage magnetic amplifier substantially similar to that shown in Fig. 2, having input binding posts 9L, 9R for receiving conductors 25.

In parallel with the input circuit I connect a simple saturating reactor having a core 71 and an A. C. winding 72. The core 71 may consist of laminations of regular transformer or choke coil type, having a closed magnetic circuit.

The core 71 may be of a magnetic material having a sharply defined saturation point such as, for example, a nickel-iron alloy having a 70 per cent or more nickel content, and known in the trade as Mumetal. The number of turns of the winding 72 may desirably be made such that saturation occurs at a voltage exceeding, by a reasonable margin, that delivered by the conductors 25 under all normal operating conditions. Under such normal circumstances the reactance of the winding 72 should be of a high value in comparison with the input impedance of the first stage 10, such that the current drawn by 72 is negligible, and no substantial reduction in the sensitivity of the amplifier results under these normal operating conditions, from the presence of the winding 72.

However, in practical applications of magnetic amplifiers, such as that exemplified in Fig. 4, in the event of an abnormal operating condition during maintenance work on a heating system, or such as might follow a prolonged power outage, it is not possible to preclude the energization of the complete control system in such a condition that one or other of the bridges may be near the balance point, while the other may be unbalanced to the maximum possible extent. As a result of such a situation, there may be applied to the magnetic amplifier a power input several thousand times greater than the normal operating level.

When this occurs, the core 71 saturates, and, by drawing a substantial magnetizing current, limits the voltage which can be applied to the magnetic amplifier input.

I have found, in practice, that any distortion of wave shape which may occur under these conditions is not such as to prevent proper operation of the control system.

While the arrangement of Fig. 8 is simple and effective, it is possible to provide still greater bypass limiter action, should it ever be found to be necessary.

Figure 9:
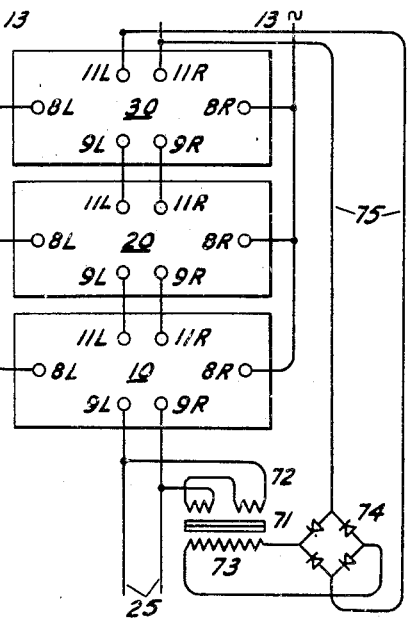

For example, in Fig. 9, I have added to the limiter reactor a direct current winding 73. The limiter may now have a core of a shape similar to that of the saturating reactor of Fig. 1. I excite the winding 73 from a rectifier 74 energized through conductors 75 from the output of the magnetic amplifier.

The rectifier 74 may preferably be of a voltage rating somewhat exceeding the output voltage occurring under normal operating conditions, so that the non-linear characteristic of the rectifier may be utilized, such that, normally, the current in 73 is substantially zero. However, when the output of the amplifier reaches a somewhat higher value, saturating current commences to flow in 73. This reinforces the A. C. saturating effect resulting from the high input level and limits any further increase in the voltage applied to the magnetic amplifier input.

The use of a limiter action having a gradual incidence is occasionally attended by the disadvantage that it may, in some cases, tend to limit the motor current with signal levels only moderately exceeding a normal value. I show in Fig. 10 a method of controlling the limiter action so that the power level, at which it comes into effect, may be adjusted with precision.

Figure 10:
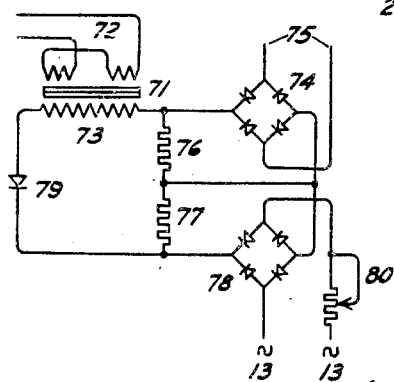

I show in Fig. 10 the limiter reactor with core 71, A. C. winding 72, and D. C. winding 73, all as shown in Fig. 9. Instead of applying the output of the rectifier 74 directly to the winding 73, I provide two resistors 76, 77, one of which is supplied by the rectifier 74 and the other by a second rectifier 78. The two resistors 76, 77, are connected together, as shown in Fig. 10, and are energized by the two rectifiers in opposite sense so that, when the voltages across the resistors 76 and 77 are equivalent, the resultant voltage across their extremities is zero. The saturating winding 73 is energized by this difference voltage in series with a half-wave rectifier 79. The rectifier 78 is energized from the A. C. source 13 in series with an adjustable resistor 80.

The action of the half-wave rectifier 79 shown in Fig. 10 is as follows. Whenever the energization of the rectifier 74, through the conductors 75, from the output of the magnetic amplifier, is such that the voltage across 76 is less than that across 77, the voltage applied to 73 and 79 in series, is of a polarity opposite to the direction of conductivity of 79. Thus the current in 73 is zero. Accordingly, no energization of 73 occurs for any magnitude of the magnetic amplifier output up to the value at which the voltage drop across 76 is equal to that across 77. When this value is exceeded, however, the half-wave rectifier 79 permits current to flow in the saturating winding 73. Thus the point at which D. C. saturation of the core 71 commences is definite; furthermore, it is controllable by the resistor 80.

Thus the arrangement of Fig. 10 gives a limiting action with a sharply defined point of incidence giving a definite cut-off action in respect to the maximum signal level applied to the magnetic amplifier input. This cut-off action, however, cannot begin to take effect until a predetermined energization of the motor has been reached.

In Fig. 2, I have shown the motor winding 15 connected to the supply 13 through the capacitor 17 in the conventional manner and have shown the motor winding 14 connected directly to the output of the last stage 30 of the amplifier, in order to avoid confusion in the description. It is definitely advantageous, and improves the power developed by the motor by more than one hundred per cent, if the first motor winding 14 be supplied from the magnetic amplifier through a condenser. It should, however, be made clear that the function of these two condensers is not the same; accordingly, their values are determined upon different principles. The condenser 17, as explained in reference to Fig. 2, has a value such as to cause the winding 15 to receive excitation having the desired phase relation. The second condenser which supplies the winding 14 is for the purpose of increasing the value of the current flowing therein and its value is accordingly determined on the basis of resonance with the reactance of the winding 14.

Also referring to Fig. 2, suitable filter circuits may be interposed between any of the amplifier stages, such as between 10 and 20 or between 20 and 30, for purposes of passing the fundamental frequency and substantially suppressing other frequencies.

While I have shown a magnetic amplifier system arranged in separate stages for the purpose of simplifying the explanation and description of the manner of operation, I wish it to be clearly understood that I may, without departing from the spirit of my invention, utilize other arrangements as may be suitable for the purpose and application required. For example, it is not necessary that separate transformers be used for the several stages. A single primary winding 5 may be utilized for all of the stages; taps may be provided thereon if the several stages require different voltages. Likewise, except for the gain control feature illustrated in Fig. 3, all of the windings 6 may comprise a plurality of secondary windings included on a single transformer, which, if desired, may be that on which the primary winding 5 is situated.

I have also found that in some cases, the operation of the invention may be materially improved by providing a filter between the output of one stage and the input of a succeeding stage. The filter may be of the usual type designed to pass the supply frequency and attenuate other frequencies.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim is new and desire to secure by Letters Patent of the United States is:

1. In combination with an electric system, magnetic amplifier means operative in accordance with the phase relation between two coexisting similar components of electrical energy derived from the system, including a plurality of saturable core devices having each an alternating current impedance winding and a direct current saturating winding, means for energizing said alternating current windings in accordance with one of said components, means for energizing said saturating windings in accordance with a function of both of said components, and means connected to be energized in accordance with a relation between the impedances of said alternating current windings.

2. In combination with an electric system, magnetic amplifier means operative in accordance with the phase relation between two coexisting similar components of electrical energy derived from the system, including a plurality of saturable core devices having each an alternating current impedance winding and a direct current saturating winding, means for energizing said alternating current windings in accordance with one of said components, a plurality of rectifiers, means for energizing each of said saturating windings from one of said rectifiers, means for energizing each of said rectifiers in accordance with a function of both of said components, and means connected to be energized in accordance with a relation between the impedances of said alternating current windings.

3. In combination with an electric system, magnetic amplifier means operative in accordance with the phase relation between two coexisting similar components of electrical energy derived from the system, including a pair of saturable core devices having each an alternating current impedance winding and a direct current saturating winding, an alternating current winding having a mid-point tap, means connecting said impedance windings in series, means for energizing said impedance windings in accordance with one of said components, means for likewise energizing said tapped winding, means energized in accordance with a relation between electrical conditions of said mid-point tap and the junction point of said series connected windings, a pair of rectifiers, means connecting each of said rectifiers with said saturating windings, means for energizing said rectifiers in like sense from one of said components, and means for energizing said rectifiers in opposite sense from another of said components.

4. In combination with an electric system, magnetic amplifier means operative in accordance with the phase relation between two co-existing similar components of electrical energy derived from the system, including a pair of saturable core devices having each an alternating current impedance winding and a direct current saturating winding, a transformer having a mid-tapped primary winding and a mid-tapped secondary winding, means for deriving a voltage from one of said components, means connecting said alternating current windings in series across said voltage, means connecting said primary winding across said voltage, means connected to be energized in accordance with the potential difference between said primary tap and the junction point of said impedance windings, a pair of rectifiers, means for energizing each of said saturating windings from the output connections of said rectifiers, means connecting each extremity of said secondary winding to an alternating connection of one of said rectifier, means for connecting together the other alternating connections of said rectifiers, and means for applying between said last mentioned junction point and said secondary tap a voltage derived from another of said components.

5. In combination with an electric system, magnetic amplifier means operative in accordance with the phase relation between two co-existing similar components of electrical energy derived from the system, including a plurality of saturable core devices having each an alternating current impedance winding and a direct current saturating winding, a plurality of transformer windings, means for deriving a voltage from one of said components, means for energizing said impedance windings and a plurality of said transformer windings from said voltage, means connected to be energized in accordance with a voltage jointly derived from a relation between said impedance windings and a relation between said transformer windings, a plurality of rectifiers, means for energizing each of said saturating windings from one of said rectifiers, means for energizing said rectifiers from further transformer windings in accordance with one of said components, and means for energizing said rectifiers in accordance with another of said components, the polarity of the connections being arranged so that said rectifiers are energized in like sense from one of said components and in opposite sense from the other of said components.

6. In combination with an electric system, magnetic amplifier means operative in accordance with the phase relation between two co-existing similar components of electrical energy derived from the system, including a pair of saturable core devices having each an alternating current impedance winding and a direct current saturating winding, an alternating current winding having a mid-point tap, means connecting said impedance windings in series, means for energizing said series connected windings from an alternating current source, means for energizing said tapped winding from said source, means connected to be energized in accordance with the potential difference between said tap and the junction point of said impedance windings, and means for differently energizing said saturating windings in accordance with energy derived from both of said components.

7. In combination with a magnetic amplifier system operative in accordance with the phase relation between two co-existing alternating current voltages derived from sources of the same frequency and having an input circuit energized from one of said sources, and an output circuit energized in accordance with the phase relation between said voltages, a saturable core device having an alternating current impedance winding and a direct current saturating winding, means for energizing said alternating current winding from said source, and rectifying means for energizing said saturating winding in accordance with the energization of said output circuit for limiting the energization of said input winding.

8. In combination with an electric system, magnetic amplifier means including a plurality of saturable core devices having each an alternating current impedance winding and a direct current saturating winding, means for deriving a voltage from said system, means for deriving a second voltage from said system variable in phase with reference to said first mentioned voltage, and means for deriving from said saturable core devices an alternating current output voltage related in phase to one of said voltages and variable in magnitude jointly in accordance with the magnitude of said other voltage and the phase relation between said voltages.

9. In combination with an electric system, means for deriving a voltage from said system, means for deriving from said system a second voltage variable in phase with reference to said first mentioned voltage, a plurality of saturable core devices having each an alternating current impedance winding and a direct current saturating winding, means for deriving from said saturable core devices an output voltage related in phase to one of said voltages and variable in magnitude jointly in accordance with the magnitude of said other voltage and the phase relation between said voltages, together with a further plurality of saturable core devices, means for energizing said further devices in accordance with said output voltage, means for deriving from said further devices an amplified output voltage related in phase and magnitude with said first mentioned output voltage, and a work device energized from said amplified output.

10. In combination with an electric system, means for deriving a voltage from said system, means for deriving from said system a second voltage variable in phase with reference to said first mentioned voltage, together with a magnetic amplifier comprising first and second stages each consisting of a pair of saturable core devices having alternating current and direct current windings a pair of rectifiers input connections and output connections, means for deriving from the first stage an output voltage related in phase to one of said voltages and variable in magnitude jointly in accordance with the magnitude of said other voltage and the phase relation between said voltages, means for energizing the input of the second stage in accordance with the output of said first stage, means for deriving from said second stage an output voltage related in phase and magnitude with said first stage output, and a work device controlled in accordance with said second stage output.

11. In combination with an electric system, means for deriving a voltage from said system, means for deriving from said system a second voltage variable in phase with reference to said first mentioned voltage, together with a magnetic amplifier comprising first and second stages each consisting of a pair of saturable core devices having alternating current and direct current windings a pair of rectifiers input connections and output connections, means for deriving from the first stage an output voltage related in phase to one of said voltages and variable in magnitude jointly in accordance with the magnitude of said other voltage and the phase relation between said voltages, filtering means for energizing the input of the second stage in accordance with the output of said first stage, means for deriving from said second stage an output voltage related in phase and magnitude with said first stage output, and a work device controlled in accordance with said second stage output.

12. A servo-mechanism control system comprising: an alternating current source, a motor, a pair of electromagnetic devices having each a plurality of relatively movable windings, a magnetic amplifier operative in accordance with the phase relation between two alternating current voltages, means for energizing a winding of one of said devices from said source, means for energizing said magnetic amplifier from said source, means connecting a plurality of windings on one of said devices with similar windings on another of said devices, means for energizing the input of said magnetic amplifier from a winding on said second mentioned device, and means connecting the output of said magnetic amplifier with said motor.

13. A servo-mechanism control system comprising: an alternating current source, a motor, a pair of electromagnetic devices having each a plurality of relatively movable windings, a magnetic amplifier comprising a plurality of stages and operative in accordance with the phase relation between two alternating current voltages, means for energizing a winding of one of said devices from said source, means connecting a plurality of windings on one of said devices with similar windings on another of said devices, means for energizing the input of said magnetic amplifier from a winding on said second mentioned device, and means connecting the output of said magnetic amplifier with said motor.

14. A servo-mechanism control system comprising: an alternating current source, a motor, a pair of electromagnetic devices having each a plurality of relatively movable windings, a magnetic amplifier operative in accordance with the phase relation between two alternating current voltages, means for energizing a winding of one of said devices from said source, means for energizing said magnetic amplifier from said source, means connecting a plurality of windings on one of said devices with similar windings on another of said devices, means for energizing the input of said magnetic amplifier from a winding on said second mentioned device, means connecting the output of said magnetic amplifier with said motor, and anti-hunting means comprising a transformer having one winding connected in parallel with said output and another winding connected in series with said input winding.

15. A servo-mechanism control system comprising: an alternating current source, a motor, a pair of electromagnetic devices having each a plurality of relatively movable windings, a magnetic amplifier comprising a plurality of stages and operative in accordance with the phase relation between two alternating current voltages, means for energizing a winding of one of said devices from said source, means connecting a plurality of windings on one of said devices with similar windings on another of said devices, means for energizing the input of said magnetic amplifier from a winding on said second mentioned device, means connecting the output of said magnetic amplifier with said motor, and anti-hunting means comprising a transformer having one winding connected in parallel with said output and another winding connected in series with said input winding.

16. A servo-mechanism control comprising: an alternating current source, a motor, a pair of electromagnetic devices having each a plurality of relatively movable windings, a magnetic amplifier comprising a plurality of stages and operative in accordance with the phase relation between two alternating current voltages, means for energizing a winding of one of said devices from said source, means connecting a plurality of windings on one of said devices with similar windings on another of said devices, means for energizing the input of said magnetic amplifier from a winding on said second mentioned device, means connecting the output of said magnetic amplifier with said motor, and means comprising a transformer having one winding connected in parallel with said output and another winding connected in series with said input, the constants of said transformer being selected so as to cause said amplifier to be maintained in a condition of oscillation, in the absence of any motion of said mechanism, whereby said mechanism may be maintained in a state of continuous oscillation within very narrow limits.

17. In combination with an electrical system, magnetic amplifier means operative in accordance with the phase relation between two co-existing similar components of electrical energy derived from the system, including a plurality of saturable core devices having each an alternating current impedance winding and a direct current saturating winding, means for energizing said alternating current windings in accordance with one of said components, a plurality of rectifiers, means for energizing all of said rectifiers in accordance with the sense of one of said components, means for increasing the energization of one of said rectifiers and decreasing the energization of the other of said rectifiers in accordance with the sense of the other of said components, means for decreasing the energization of said first mentioned rectifier and increasing the energization of said second mentioned rectifier in accordance with the opposite sense of said other component, and means connected to be energized in accordance with a relation between the impedances of said alternating current windings.

18. In combination with an electric system, magnetic amplifier means operative in accordance with the phase relation between two co-existing similar components of electrical energy derived from the system, including a plurality of saturable core devices having each an alternating current impedance winding and a direct current saturating winding, means for energizing said alternating current windings in accordance with one of said components, means for energizing said saturating windings in accordance with the sense of one of said components, means for increasing the energization of one of said saturating windings and decreasing the energization of the other of said saturating windings in accordance with a function of said components, means for decreasing the energization of said first mentioned saturating winding and increasing the energization of the other saturating winding in accordance with the opposite function of said components, and means connected to be energized in accordance with a function of the impedance of said alternating current windings.

19. In combination with an electric system, magnetic amplifier means operative in accordance with the phase relation between two co-existing similar components of electrical energy derived from the system, comprising a multi-stage arrangement consisting of a plurality of stages connected in cascade, each stage including a plurality of saturable core devices having each an alternating current impedance winding and a direct current saturating winding, means for energizing said alternating current windings in accordance with one of said components, means for energizing said saturating windings in accordance with a function of both of said components, and means connected to be energized in accordance with a relation between the impedances of said alternating current windings.

20. In combination with an electric system, magnetic amplifier means operative in accordance with the phase relation between two coexisting similar components of electrical energy derived from the system, comprising a multistage arrangement consisting of a plurality of stages connected in cascade, the output of each stage being connected to the input of the succeeding stage in series with a filter designed to pass energy of the frequency of the said system and to attenuate higher frequency energy, each said stage including a pair of saturable core devices having each an alternating current impedance winding and a direct current saturating winding, a transformer having a mid-tapped primary winding and a mid-tapped secondary winding, means for deriving a voltage from one of said components, means connecting said alternating current windings in series across said voltage, means connecting said primary winding across said voltage, means connected to be energized in accordance with the potential difference between said primary tap and the junction point of said impedance windings, a pair of rectifiers, means for energizing each of said saturating windings from the output connections of said rectifiers, means connecting each extremity of said secondary winding to an alternating connection of one of said rectifiers, means for connecting together the other alternating connections of said rectifiers, and means for applying between said last mentioned junction point and said secondary tap a voltage derived from another of said components.

21. In combination with an electric system, magnetic amplifier means operative in accordance with the phase relation between two coexisting similar components of electrical energy derived from the system, comprising a multistage arrangement consisting of a plurality of stages connected in cascade, the output of each stage being connected to the input of the succeeding stage by means of a series connected capacity and choke resonant at the frequency of the said system, each said stage including a pair of saturable core devices having each an alternating current impedance winding and a direct current saturating winding, a transformer having a mid-tapped primary winding and a mid-tapped secondary winding, means for deriving a voltage from one of said components, means connecting said alternating current windings in series across said voltage, means connecting said primary winding across said voltage, means connected to be energized in accordance with the potential difference between said primary tap and the junction point of said impedance windings, a pair of rectifiers, means for energizing each of said saturating windings from the output connections of said rectifiers, means connecting each extremity of said secondary winding to an alternating connection of one of said rectifiers, means for connecting together the other alternating connections of said rectifiers, and means for applying between said last mentioned junction point and said secondary tap a voltage derived from another of said components.

ALAN S. FITZ GERALD.

REFERENCES CITED

The following references are of record in the file of this patent:

UNITED STATES PATENTS

| Number | Name | Date |
| --- | --- | --- |
| 2,401,168 | Kronenberger | May 28, 1946 |
| 2,414,430 | Nisbet | Jan. 14, 1947 |

OTHER REFERENCES

"Theory of Servo Systems, with Particular Reference to Stabilization," by A. L. Whiteley, published in the Institution of Electrical Engineers Journal, vol. 93, No. 34, part II (Power Eng.), August 1946, pages 353–367. (Discussion, pages 368–372.)